July 5, 1960  D. ALLENDEN  2,944,216
CURRENT MEASURING CIRCUIT
Filed Aug. 6, 1956
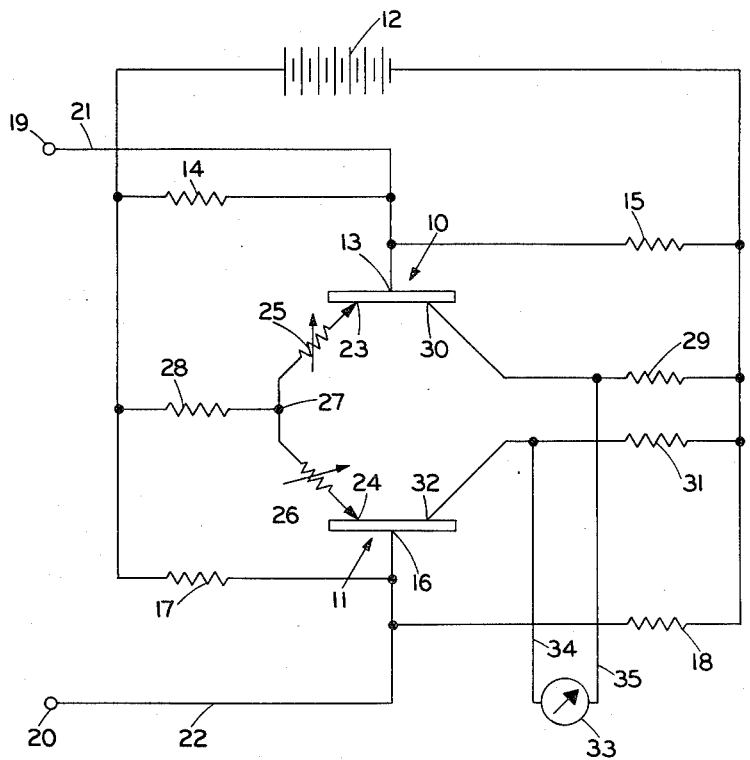
Inventor:
Dennis Allenden
by Richard E. Horley
His Attorney United States Patent Office 2,944,216
Patented July 5, 1960

2,944,216

CURRENT MEASURING CIRCUIT

Dennis Allenden, Baughurst, near Basingstoke, England, assignor to Associated Electrical Industries Limited, London, England, a British company Filed Aug. 6, 1956, Ser. No. 602,305

Claims priority, application Great Britain Aug. 11, 1955

1 Claim. (Cl. 324—123)

This invention pertains to a current measuring circuit and more particularly to a current measuring circuit having transistor devices therein.

Measurement of extremely small currents by conventional techniques requires sensitive measuring devices which because of their mechanical delicacy do not lend themselves to practical uses where extreme care in handling, setup, and operation cannot be exercised except at great sacrifice of time and economy. Amplification of the currents to be measured to enable use of less delicate and more easily handled devices required apparatus which, if not complex and costly, had unsatisfactory stability due to temperature effects particularly where a low impedance signal source current was to be measured.

It is an object of this invention to provide an improved current measuring circuit permitting utilization of a robust, low sensitivity measuring device.

It is also an object of this invention to provide an improved current measuring circuit having improved stability, particularly where current is to be measured in signal sources of a low impedance level.

It is a further object to provide an improved current measuring circuit which is capable of easy adjustment of sensitivity range of measurements.

According to the present invention, a current measuring circuit is provided comprising a pair of transistors having their base-emitter circuits connected in series opposition as well as being adapted for external connection to a source to be measured. A current measuring device, preferably a moving coil microammeter, is connected across the output circuits of the transistors. Biasing of the transistors is obtained by suitable connection of the electrode circuits to an operating voltage source. By virtue of the series opposition connection of the base-emitter circuits, a current flowing therein will cause current flow in the output circuits of the transistors to vary differentially, thereby actuating the current measuring device.

In the preferred embodiment, the base electrodes of the transistors are adapted for external connection and the emitter electrodes are connected together and to the voltage source through a high resistance. It will be seen that the high resistance in the emitter circuits, together with a low impedance in the base circuit (particularly where the sum of the inherent impedance of the base circuits and the impedance of the signal source is less than 1000 ohms), provides a measure of temperature compensation for the transistors. Additionally, it will be seen that stability is improved by connecting the emitter circuits of the transistors together. The current measuring device is preferably connected across the collector electrodes of the transistors.

In carrying out the invention, a potential divider network is provided which ensures that required potentials are acquired from a single operating source voltage for the various transistor electrodes. Calibration and sensitivity adjustments of the circuit can be practiced by providing variable resistor elements in the emitter circuits.

The features of this invention which are believed to be novel are set forth with particularity in the appended claim. The invention itself may be better understood as to organization and construction as well as to further objects and advantages by reference to the following description taken in conjunction with the accompanying drawing in which the sole figure is a circuit diagram illustrating an embodiment of the invention.

A current measuring circuit incorporating the features of this invention in one embodiment is disclosed in the figure in which a pair of transistors 10 and 11 of any well-known type are adapted for connection to an operating voltage source 12 shown conventionally as a battery. The transistors 10 and 11 may be either n-p-n or p-n-p junction types, but it is necessary for best performance that they be of the same type and that they have matched characteristics. While any number of arrangements may be had for applying suitable potentials to the transistors to acquire the desired transistor action, it is a feature of this invention to provide a network of resistor elements arranged to be connected to a single operating source and to the base, emitter, and collector electrodes of the respective transistors. In the preferred embodiment of the figure, base electrode 13 of transistor 10 is connected to the junction of potential dividing series connected resistor elements 14 and 15 forming a first branch, the opposite ends of which are connected across opposite terminals of the source 12. Thus, the voltage level of base electrode 13 is fixed by the selection of the magnitudes of resistors 14 and 15 in conjunction with source 12. In a like manner, the base electrode 16 of transistor 11 is connected to the junction of series connected resistor elements 17 and 18 which form a second branch of the network, the ends of which are connected across the source 12 in parallel with the first branch preferably forming common junctions. The resistor elements 17 and 18 of the second branch are likewise selected to establish the potential level of base electrode 16 of transistor 11. In the preferred mode of practicing this invention, the resistor elements 14, 15, 17, and 18 are so selected that the potential levels of the base electrodes 13 and 16 are equal.

The current measuring circuit is completed by connection of the base-emitter circuits of transistors 10 and 11 in series opposition and the output or collector circuits to an appropriate current measuring device whereby differentially varying outputs will actuate the device. In the preferred form, this is practiced by adapting the base electrodes 13 and 16 of transistors 10 and 11 respectively to be connected to terminals 19 and 20 as by lead connections 21 and 22 and of any suitable type for connection to an external signal source and by connecting the emitter electrodes 23 and 24 through variable resistor elements 25 and 26 which meet at a junction 27. Connection of the emitter circuits is then made from junction 27 to the appropriate side of source 12 through resistor 28. The output circuit of transistor 10 comprises a resistor element 29 connected in series with collector electrode 30 while the output circuit of transistor 11 comprises a like resistor element 31 connected in series with collector electrode 32. The terminal ends of resistor elements 29 and 31 are connected to a common junction preferably as part of the resistor network to the terminal of source 12 opposite that to which the emitter circuits are connected. Thus, the resistor elements 29 and 31 in the collector circuits function to establish the potential level of the collector electrodes 30 and 32. A like function is performed by resistors 25, 26, and 28 in the emitter circuits. However, resistors 25 and 26, being variable, also serve to permit adjustment of the sensitivity and calibration of the current measuring circuit whereas temperature compensation is obtained when resistor 28 is selected so as to make the total resistance of the emitter circuits very much greater than the impedance of their respective base circuits, which in the embodiment described are intended to be equal. The impedance of the base circuits is definable in terms of the effective resistance of the base circuit including resistors 14 and 15, and 17 and 18, the inherent impedance of the transistors 10 and 11, and the impedance of the signal source. It has been discovered that a high resistance, such as to be much greater than the base circuit impedance, in the emitter circuit is particularly effective to compensate for temperature variations in the base circuits when the resistance of the signal source is less than 1000 ohms.

Measurement of the current signal in the base-emitter circuits is effectuated by a current measuring device 33 which is connected by suitable leads 34 and 35 across the output circuits preferably at the collector electrodes 30 and 32, respectively. While the current measurement device may be of a suitable number of types, it is preferred that it be a moving coil instrument in which the torque on the moving system arises from the passage of the resultant of the output circuits currents through a coil which is suitably pivoted in the field of a permanent magnet.

Operation of the circuit is as follows. In the absence of signal between the terminals 19 and 20, resistor elements 14, 15, and 17, 18 define a definite voltage level at the base electrodes 13 and 14 of transistors 10 and 11, respectively. Since the base-emitter circuits of the transistors are conducting and preferably have only a small potential difference across them, the voltages at the emitter electrodes 23 and 24 are thus set and, since the total emitter circuit resistance is fixed, the currents, which may conveniently be called standing currents, in the emitter circuit and in the collector circuits are defined and are equal. Thus, there is no potential difference between the collector electrodes 30 and 32 of transistors 10 and 11, respectively, and a zero indication appears on the meter.

If now a current is passed between terminals 19 and 20, it will reduce the standing base current of transistor 10 and increase that of transistor 11 and these increments of decrease and increase will be amplified differentially in the output circuits producing a deflection of the current measuring device 33. It is to be noted that the differential action of the transistors on the current measuring device 33 by virtue of the base-emitter series opposition connection improves stability since output current changes due to changes in base circuit currents caused by variations in temperature tend to cancel. Zero drift of the current measuring device can thus be reduced to a degree less than 0.05 microampere per degree C., corresponding to less than 1 percent of full scale of a 50 microampere meter over a normal range of temperatures. Preferably, the resistance of the current measuring device 33 is low relative to resistor elements 29 and 31, thereby causing almost the whole of the differential current to be carried by the device 33. Thus connection of the current measuring device 33 to the collector electrodes directly further increases the sensitivity range of the arrangement.

By referring to the figure, it will be appreciated that the entire input current between the terminals 19 and 20 does not pass through the base-emitter circuits, some being shunted via the two alternative parallel branches of the potential divider network containing resistor elements 14 and 15, and 17 and 18, respectively. Hence, the sensitivity of the current measuring circuit can be adjusted by resistor elements 25 and 26 since variation in their value alters the proportion of input current which flows through the transistors. The device thereby can be calibrated by the passage of a known current through the base-emitter circuits and adjusting resistor elements 25 and 26 for desired sensitivity. The sensitivity realizable by the circuit described is up to 50 times that of the current measuring device used. Thus, it will be appreciated that a low sensitivity instrument capable of being of robust structure can, in the combination described, be employed to measure currents otherwise requiring a much more sensitive and delicate instrument.

Therefore, while a particular embodiment of the subject invention has been shown and described herein, it is in the nature of description rather than limitation, and it will occur to those skilled in the art that various changes, modifications, and combinations may be made within the province of the appended claim, and without departing either in spirit or scope from this invention in its broader aspects.

What I claim as new and desire to secure by Letters Patent of the United States is:

A current measuring circuit comprising a pair of transistors, each having base, collector and emitter electrodes, a single source of voltage, a potential divider network including two branches connected across said source of voltage, each branch being associated with one of said pair of transistors, each branch having two series connected resistors, the junction of the two series connected resistors in each branch being connected to the base electrode of the corresponding one of said pair of transistors whereby a predetermined potential is imposed upon the base of each transistor, said network including emitter circuits of said transistors connected together and through a high resistance to one side of said voltage source and collector circuits connected to the opposite side of said source, said collector circuits comprising resistor elements in series with the collector electrodes of said transistors, means adapting the base electrodes of said transistors for external connection in series with the circuit carrying current to be measured, and a current measuring device connected across said collector circuits at said collector electrodes.

References Cited in the file of this patent

UNITED STATES PATENTS

| | | |
|---|---|---|
| 2,240,635 | Avins | May 6, 1941 |
| 2,329,073 | Mitchell et al. | Sept. 7, 1943 |
| 2,662,123 | Koenig | Dec. 8, 1953 |
| 2,680,160 | Yaeger | June 1, 1954 |
| 2,866,859 | Stanley | Dec. 30, 1958 |

OTHER REFERENCES

Article by Slaughter published in Transactions of the IRE Professional Group on Circuit Theory, vol. CT–3, March 1956, pages 51–53.

Article by Starke published in Radio and Television News, December 1953, pages 82, 83 and 148–151.

Publication: "Feedback-Stabilized Transistor Amplifier," by D. W. Slaughter, Electronics, May 1955, pages 174 and 175.